US012224534B2

(12) United States Patent
Fukuchi et al.

(10) Patent No.: US 12,224,534 B2
(45) Date of Patent: Feb. 11, 2025

(54) WIRING COMPONENT WITH TEMPERATURE SENSOR

(71) Applicants: Proterial, Ltd., Tokyo (JP); Hitachi Astemo, Ltd., Ibaraki (JP)

(72) Inventors: Keisuke Fukuchi, Tokyo (JP); Junjie Shen, Ibaraki (JP)

(73) Assignees: Proterial, Ltd., Tokyo (JP); Hitachi Astemo, Ltd., Ibaraki (JP)

(*) Notice: Subject to any disclaimer, the term of this patent is extended or adjusted under 35 U.S.C. 154(b) by 407 days.

(21) Appl. No.: 17/552,710

(22) Filed: Dec. 16, 2021

(65) Prior Publication Data
US 2022/0231467 A1     Jul. 21, 2022

(30) Foreign Application Priority Data
Jan. 15, 2021   (JP) ................. 2021-005053

(51) Int. Cl.
| | | |
|---|---|---|
| H01R 13/66 | (2006.01) | |
| G01K 1/08 | (2021.01) | |
| G01K 1/14 | (2021.01) | |
| G01K 7/22 | (2006.01) | |
| H01R 13/405 | (2006.01) | |
| H01R 13/504 | (2006.01) | |
| H02G 3/04 | (2006.01) | |

(52) U.S. Cl.
CPC .......... *H01R 13/6683* (2013.01); *G01K 1/08* (2013.01); *G01K 1/14* (2013.01); *G01K 7/22* (2013.01); *H01R 13/405* (2013.01); *H01R 13/504* (2013.01); *H02G 3/0456* (2013.01)

(58) Field of Classification Search
CPC .............. G01K 1/14; G01K 1/08; G01K 7/22; H01B 17/58; H01R 12/53; H01R 13/7137; H01R 13/405; H01R 13/46; H01R 13/66; H01R 31/06; H01R 24/62
USPC ............................ 174/74 R, 78, 84 R, 88 R
See application file for complete search history.

(56) References Cited

U.S. PATENT DOCUMENTS 7,690,262 B2 * 4/2010 Nakabayashi .......... G01L 23/24
                                                               73/756
11,054,316 B2   7/2021 Yoshihara
(Continued)

FOREIGN PATENT DOCUMENTS

| JP | WO2015/001404 A1 * | 1/2005 | ............... G01K 1/14 |
| JP | 2017-227568 A | 12/2017 | |

(Continued)

OTHER PUBLICATIONS

"Notice of Reasons for Refusal" Office Action issued in JP 2021-005053; mailed by the Japanese Patent Office on Feb. 13, 2024.

*Primary Examiner* — William H. Mayo, III
(74) *Attorney, Agent, or Firm* — Studebaker & Brackett PC

(57) ABSTRACT

A wiring component with temperature sensor includes an electric wire, a temperature sensor including a detection unit configured to detect temperature of the electric wire and a plurality of lead wires, and a plurality of connector pins respectively connected to the plurality of lead wires. The electric wire, the temperature sensor and the plurality of connector pins are collectively held by a holder made of a resin. The holder includes a connector housing member configured to hold the plurality of connector pins and a molded resin member covering a portion of the connector housing member.

14 Claims, 4 Drawing Sheets

(56) References Cited

U.S. PATENT DOCUMENTS

| | | |
|---|---|---|
| 11,274,974 B2 | 3/2022 | Ogata et al. |
| 2015/0288110 A1* | 10/2015 | Taniguchi .......... H01R 13/7137 439/620.22 |
| 2017/0110837 A1* | 4/2017 | Taniguchi .............. H01R 12/53 |
| 2019/0316974 A1 | 10/2019 | Ogata et al. |
| 2020/0182708 A1 | 6/2020 | Yoshihara |

FOREIGN PATENT DOCUMENTS

| | | |
|---|---|---|
| JP | 2019-184471 A | 10/2019 |
| JP | 2020-153696 A | 9/2020 |

\* cited by examiner

WIRING COMPONENT WITH TEMPERATURE SENSOR

CROSS-REFERENCE TO RELATED APPLICATION

The present patent application claims the priority of Japanese patent application No. 2021-005053 filed on Jan. 15, 2021, and the entire contents of Japanese patent application No. 2021-005053 are hereby incorporated by reference.

TECHNICAL FIELD

The present invention relates to a wiring component with temperature sensor that is a component having electric wires and a temperature sensor.

BACKGROUND ART

Conventionally, to prevent damage caused by, e.g., overheating of coil windings of an electric motor, temperature of an electric wire carrying a current supplied to the electric motor is detected by a temperature sensor, and when the detected temperature is not less than a predetermined value, the current supplied to the electric motor is stopped or reduced.

A temperature sensor described in Patent Literature 1 includes a heat-sensitive body such as a thermistor for detecting temperature of a measurement target object, a pair of leads respectively connected to a pair of electrodes of the heat-sensitive body, a first fixing member having a first recess and a second fixing member having a second recess, and the measurement target object is housed in a through-hole formed by a combination of the first recess and the second recess. The first fixing member and the second fixing member are made of a resin such as engineering plastic, and are joined to each other in a state in which the measurement target object is sandwiched therebetween. The heat-sensitive body is insert molded into the first fixing member and the pair of leads are respectively connected to a pair of wires inside the first fixing member. The pair of wires extend out of the first fixing member and are connected to a sensor measuring device, and temperature of the measurement target object can be detected by measuring a resistance value between the pair of wires using the sensor measuring device. The measurement target object is, e.g., a wiring component in a motor device.

CITATION LIST

Patent Literature

Patent Literature 1: JP 2020-1536% A

SUMMARY OF INVENTION

For the temperature sensor described in Patent Literature 1, it is necessary to lead the pair of wires out of a cavity of a mold when molding the first fixing member. This work is difficult to automate, and when the work of leading out these wires is performed manually, a long working time is required, which leads to an increase in manufacturing cost.

Therefore, it is an object of the invention to provide a wiring component with temperature sensor that facilitates automation and can reduce the cost.

For solving the above problem, one aspect of the present invention provides a wiring component with temperature sensor, comprising:
an electric wire;
a temperature sensor comprising a detection unit configured to detect temperature of the electric wire and a plurality of lead wires; and
a plurality of connector pins respectively connected to the plurality of lead wires,
wherein the electric wire, the temperature sensor and the plurality of connector pins are collectively held by a holder comprising a resin, and
wherein the holder comprises a connector housing member configured to hold the plurality of connector pins and a molded resin member covering a portion of the connector housing member

THE EFFECT OF THE INVENTION

According to the present invention, it is possible to provide a wiring component with temperature sensor that facilitates automation and can reduce the cost.

DESCRIPTION OF EMBODIMENTS

Embodiment

Figure 1:
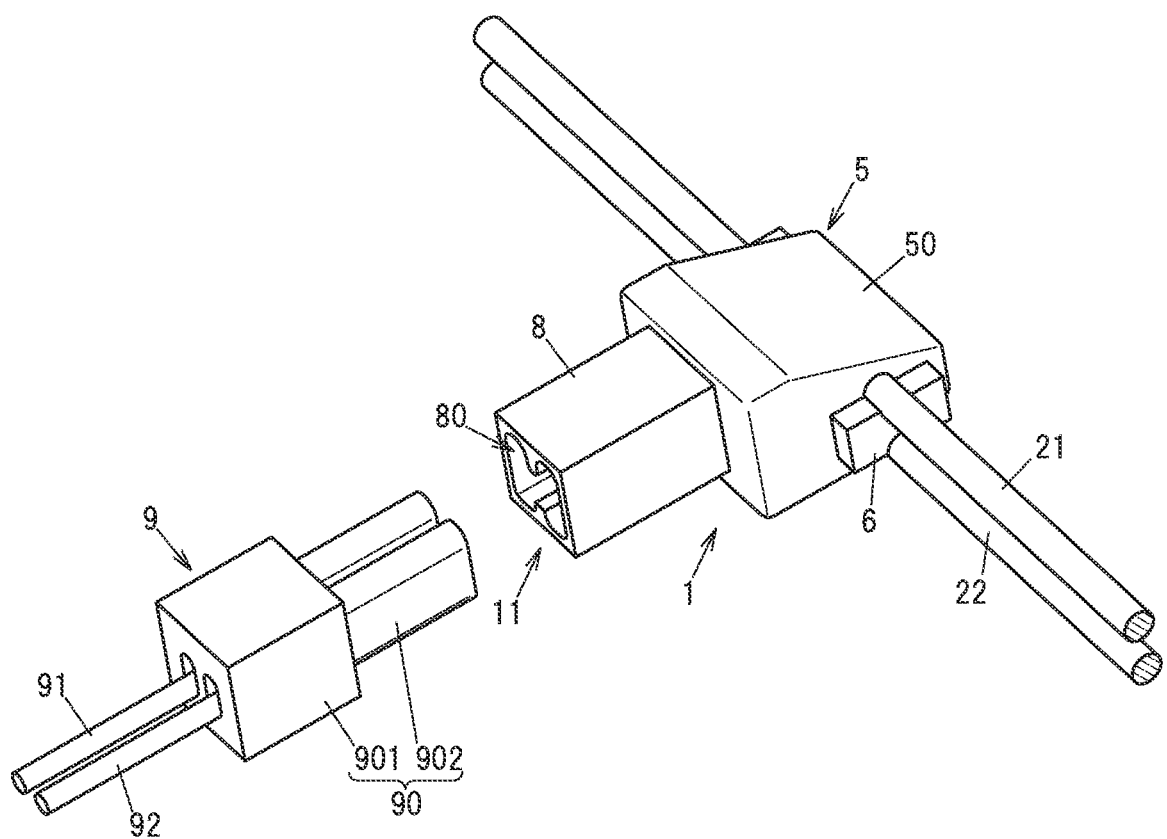
FIG. 1 is a perspective view showing a wiring component with temperature sensor in an embodiment of the present invention and another connector.
Figure 2:
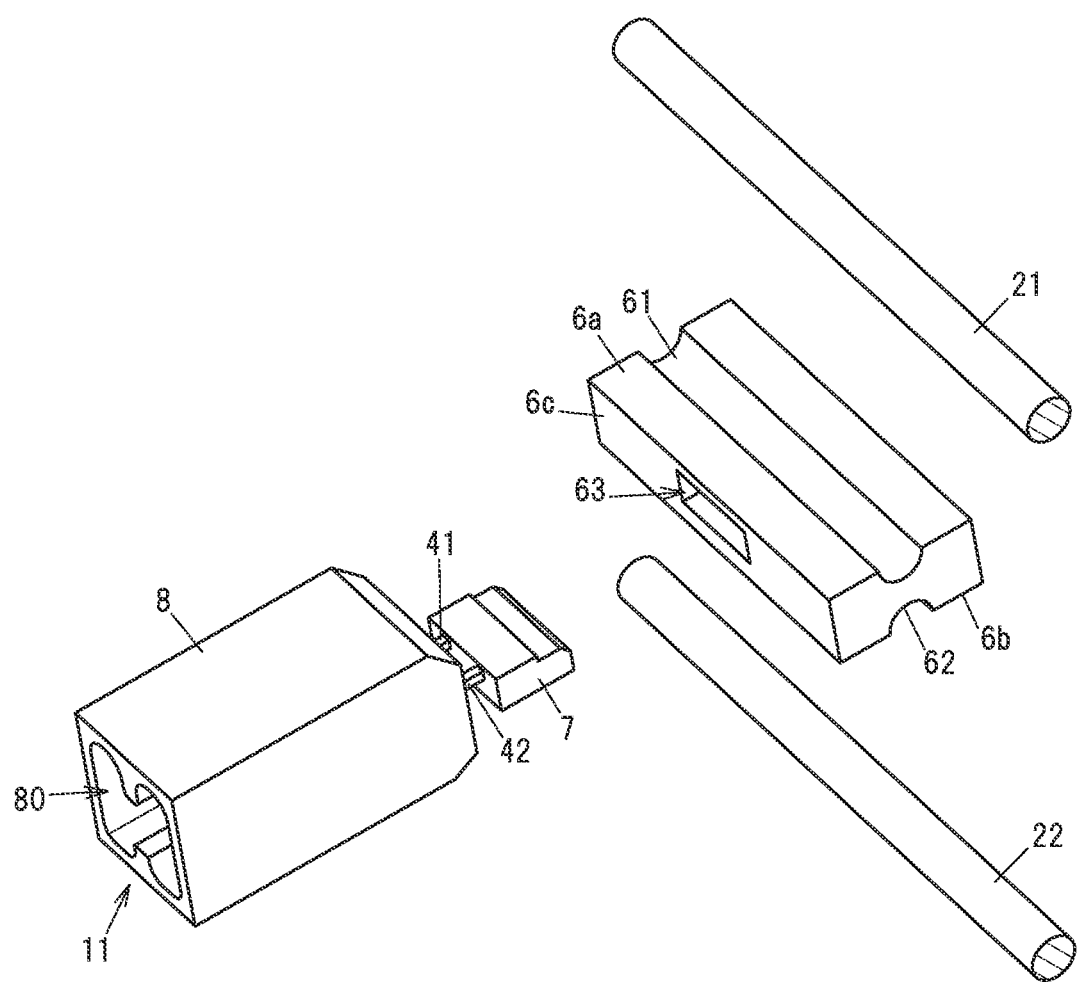
FIG. 2 is a perspective view showing constituent elements of the wiring component with temperature sensor.
Figure 3:
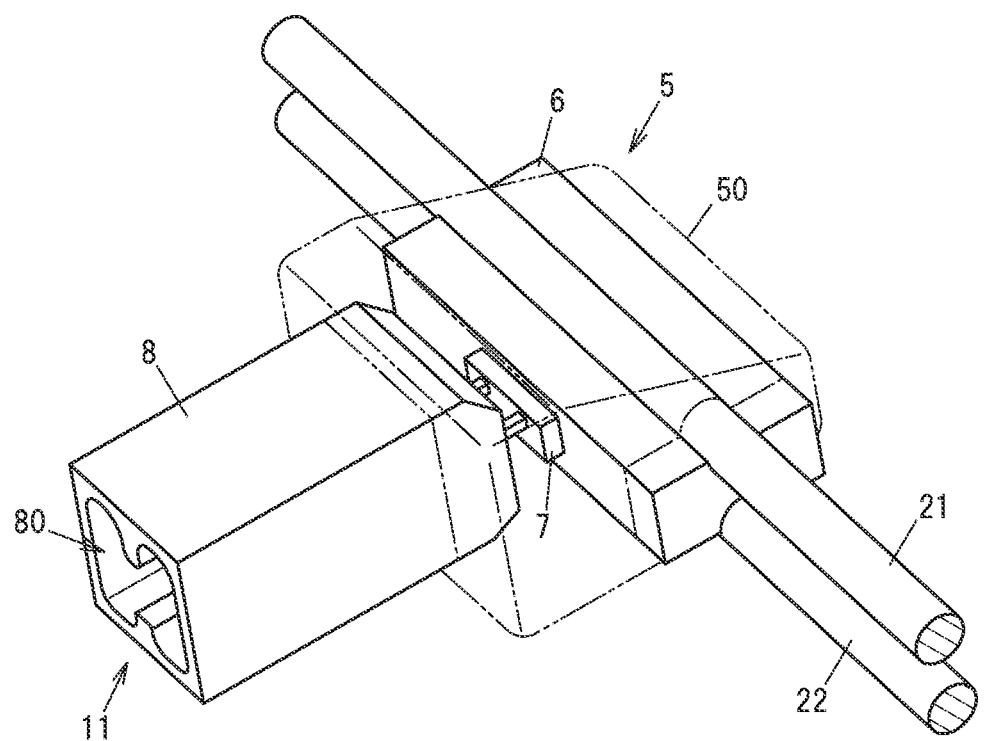
FIG. 3 is a perspective view showing the wiring component with temperature sensor, in which a molded resin member is indicated by phantom lines and the inside thereof is indicated by solid lines.
Figure 4A:
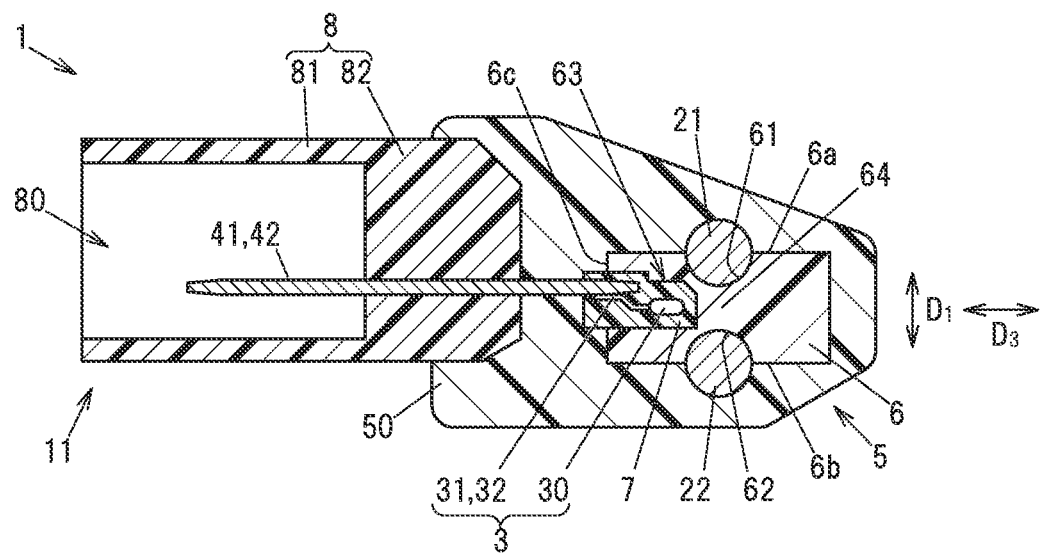
FIGS. 4A and 4B are cross sectional views showing the wiring component with temperature sensor.
Figure 4B:
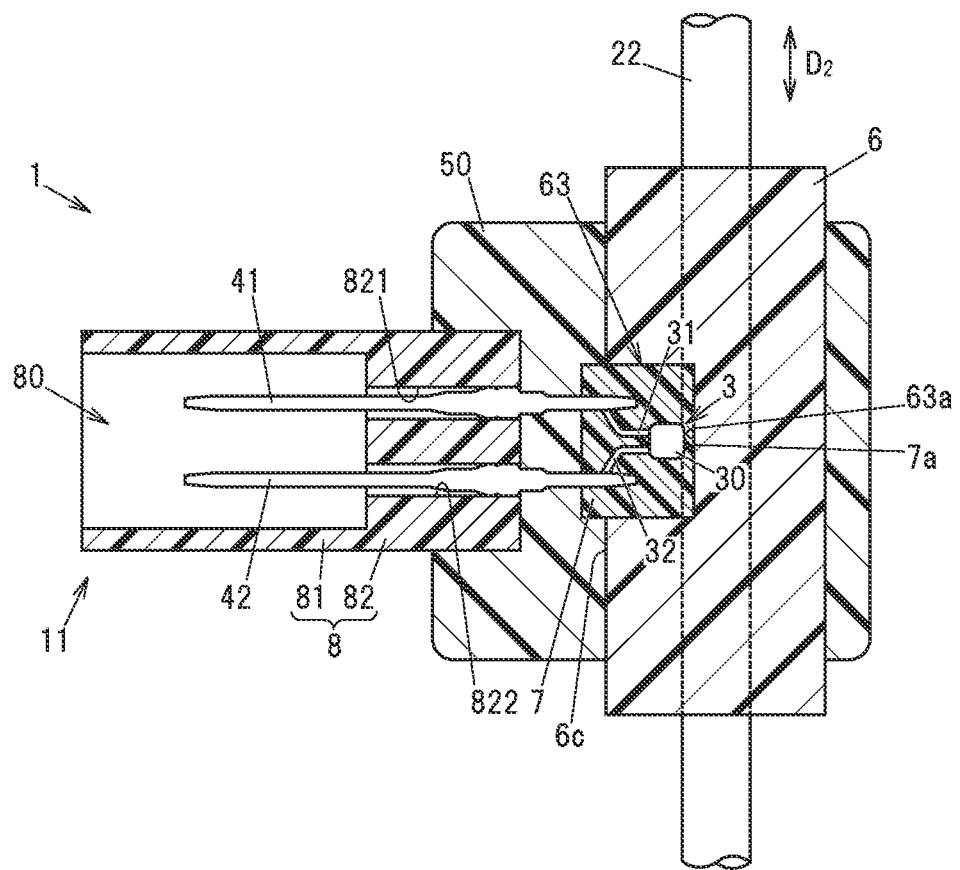

FIG. 1 is a perspective view showing a wiring component with temperature sensor in an embodiment of the invention and another connector to be fitted to a connector portion of the wiring component with temperature sensor. FIG. 2 is a perspective view showing each constituent element of the wiring component with temperature sensor. FIG. 3 is a perspective view showing the wiring component with temperature sensor, in which a molded resin member is indicated by phantom lines and the inside thereof is indicated by solid lines. FIGS. 4A and 4B are cross sectional views showing the wiring component with temperature sensor.

A wiring component with temperature sensor 1 (i.e., temperature sensor-including wiring component 1) includes plural electric wires 21, 22, a temperature sensor 3 (see FIG. 4) having a detection unit 30 to detect temperature of the electric wires 21, 22 and plural lead wires 31, 32, plural connector pin 41, 42 respectively connected to the plural lead wires 31, 32, and a resin holder 5 collectively holding them. The plural electric wires 21, 22 extend linearly and parallel to each other inside the holder 5. In FIGS. 1 to 4, only a portion of the electric wires 21, 22 in a longitudinal direction is shown.

The holder 5 is provided with a connector portion 11 to which another connector 9 is fitted. In the other connector 9, plural connector terminals (not shown) are arranged in a resin connector housing 90 and signal lines 91, 92 respectively connected to the plural connector terminals extend out of the connector housing 90. The connector housing 90 integrally has a base portion 901 and a protruding portion 902, and the protruding portion 902 is housed in the holder 5 when the other connector 9 is fitted to the connector portion 11 of the wiring component with temperature sensor 1. The signal lines 91, 92 are insulated wires in each of which a stranded wire having excellent flexibility is covered with an insulator.

The plural electric wires 21, 22 are solid wires coated with enamel and are used to, e.g., supply a drive current to coils of a motor that generates mechanical movement by electromagnetic action, such as electric motor or electromagnetic actuator. Although two electric wires 21, 22 are held by the holder 5 in the present embodiment, the number of the electric wires held by the holder 5 may be one or not less than three. In addition, the electric wires 21, 22 are round wires having a circular cross-sectional shape and the same diameter in the present embodiment, but it is not limited thereto. The electric wires 21, 22 may be, e.g., rectangular wires having a rectangular cross-sectional shape.

The temperature sensor 3 is, e.g., a thermistor whose electrical resistance changes depending on temperature. In the detection unit 30, a temperature detection element is sealed with a sealing material such as glass and the lead wires 31, 32 extending inside and outside the sealing material are connected to electrodes of the temperature detection element. The temperature sensor 3 is not limited to the thermistor, and, e.g., a thermocouple may be used.

The lead wires 31, 32 of the temperature sensor 3 are respectively connected to end portions of the connector pins 41, 42 on one side in the longitudinal direction by, e.g., welding. Alternatively, the lead wires 31, 32 of the temperature sensor 3 may be connected to the connector pins 41, 42 by, e.g., soldering.

The holder 5 includes a connector housing member 8 that holds the connector pins 41, 42 and constitutes the connector portion 11, and a portion of the connector housing member 8 is covered with a molded resin member 50 formed by molding. The holder 5 also has an electric wire holding member 6 to hold the electric wires 21, 22 and a sensor holding member 7 to hold the temperature sensor 3, and the electric wire holding member 6 and the sensor holding member 7, together with the connector housing member 8, are integrated by the molded resin member 50. Each of the electric wire holding member 6, the sensor holding member 7 and the connector housing member 8 is formed of a resin and is pre-molded before the molded resin member 50 is molded.

The molded resin member 50 covers at least a portion of each of the electric wire holding member 6, the sensor holding member 7 and the connector housing member 8. The electric wire holding member 6, the sensor holding member 7 and the connector housing member 8 are integrated by the molded resin member 50 and constitute, together with the molded resin member 50, the holder 5.

The electric wires 21, 22 are held by the electric wire holding member 6 at a distance from each other along a predetermined arrangement direction $D_1$ (see FIG. 4A). The arrangement direction $D_1$ is a direction perpendicular to a wire extending direction $D_2$ (see FIG. 4B) which is coincident with the longitudinal direction of a portion of the electric wires 21, 22 held by the electric wire holding member 6, and the distance between the electric wires 21, 22 in the arrangement direction $D_1$ is, e.g., smaller than a diameter of the electric wires 21, 22.

The electric wire holding member 6 has a substantially rectangular parallelepiped shape, on which a first recessed groove 61 to house a portion of the electric wire 21, which is one of the plural electric wires 21, 22, in a circumferential direction and a second recessed groove 62 to house a portion of the other electric wire 22 in the circumferential direction are formed in parallel to each other. The electric wire holding member 6 is configured such that a front surface 6a having the first recessed groove 61 and a back surface 6b having the second recessed groove 62 are rectangular flat surfaces perpendicular to the arrangement direction $D_1$ of the electric wires 21, 22, and the first and second recessed grooves 61, 62 extend along a direction of the long side of these surfaces.

A housing hole 63 opening on a side surface 6c between the front surface 6a and the back surface 6b is also formed on the electric wire holding member 6. The housing hole 63 is a hole configured to house the sensor holding member 7 and opens in a direction $D_3$ that is perpendicular to the arrangement direction $D_1$ of the electric wires 21, 22 and the wire extending direction $D_2$ (hereinafter, this direction is referred to as a perpendicular direction $D_3$).

The housing hole 63 is formed so that at least a portion thereof is located between the one electric wire 21 and the other electric wire 22 when the electric wires 21, 22 held by the electric wire holding member 6 are viewed in the perpendicular direction $D_3$. In the present embodiment, the housing hole 63 and a thin portion 64, which is a portion of the electric wire holding member 6 located between the deepest portion of the first recessed groove 61 and the deepest portion of the second recessed groove 62, are arranged side-by-side in the perpendicular direction $D_3$. As a result, the detection unit 30 of the temperature sensor 3 can be arranged at a position where heat generated by a current flowing through the electric wires 21, 22 is easily transmitted, an increase in size of the electric wire holding member 6 can be suppressed, and the electric wire holding member 6 can be formed small in size. In this regard, the housing hole 63 may be formed to extend from the side surface 6c to a position between the deepest portion of the first recessed groove 61 and the deepest portion of the second recessed groove 62, and the temperature sensor 3 may be arranged so that the detection unit 30 is located between the one electric wire 21 and the other electric wire 22.

The sensor holding member 7 houses the temperature sensor 3 and end portions of the connector pins 41, 42 respectively connected to the lead wires 31, 32 of the temperature sensor 3. The detection unit 30 of the temperature sensor 3 is fixed inside the sensor holding member 7. The temperature sensor 3 is insert molded so as to be entirely covered with the sensor holding member 7 in the present embodiment, but the lead wires 31, 32 and the connector pins 41, 42 may be connected outside the sensor holding member 7. The sensor holding member 7 may have a box shape in which the temperature sensor 3 is housed.

The electric wire holding member 6 and the sensor holding member 7 are integrated by the molded resin member 50 in a state in which the sensor holding member 7 is housed in the housing hole 63 of the electric wire holding member 6. An inside dimension of the housing hole 63 is slightly larger than an outside dimension of the sensor holding member 7.

When the sensor holding member 7 is inserted into the deepest part of the housing hole 63, i.e., when a front end face 7a of the sensor holding member 7 is in contact with a bottom surface 63a of the housing hole 63 as shown in FIG. 4B, a portion of the sensor holding member 7 protrudes outside the housing hole 63 from the side surface 6c of the electric wire holding member 6. As a result, when molding the molded resin member 50, it can be confirmed by worker's visual check or by analyzing an image taken by a camera that the sensor holding member 7 has been inserted into the deepest part of the housing hole 63.

The connector housing member 8 has a bottomed cylindrical shape having a bore 80 to house the protruding portion 902 of the other connector 9, and integrally has a cylindrical portion 81 and a bottom portion 82. The connector pins 41, 42 are press-fitted into through-holes 821, 822 formed on the bottom portion 82, and other end portions of the connector pins 41, 42 in the longitudinal direction on the opposite side to the end portions connected to the temperature sensor 3 protrude inside the bore 80. Alternatively, the connector pins 41, 42 may be insert molded into the connector housing member 8.

The connector pins 41, 42 do not protrude outside from the bore 80 of the connector housing member 8 and are connected to the connector terminals of the other connector 9 inside the bore 80. By covering a portion of the connector housing member 8 with the molded resin member 50 and housing the entire connector pins 41, 42 in the holder 5 as described above, it is possible to suppress bending of the connector pins 41, 42 caused by, e.g., contact with the connector housing 90 during work of fitting to the other connector 9, etc., as compared to when the connector pins 41, 42 partially protrude outside the holder 5.

The molded resin member 50 is formed by injecting a molten resin into a cavity of a mold in a state in which the electric wire holding member 6, the sensor holding member 7 and the connector housing member 8 are arranged in the mold as indicated by the solid lines in FIG. 3. Portions of the electric wires 21, 22 in the circumferential direction, which are not housed in the first recessed groove 61 and the second recessed groove 62, are completely covered with the molded resin member 50. That is, in the vicinity of the temperature sensor 3, the electric wires 21, 22 are held by the holder 5 entirely in the circumferential direction. The molded resin member 50 may be, or may not be, fused to the electric wire holding member 6, the sensor holding member 7 and the connector housing member 8 by heat during injection molding.

When the other connector 9 is fitted into the connector portion 11 of the wiring component with temperature sensor 1, the lead wires 31, 32 of the temperature sensor 3 are electrically connected to the signal lines 91, 92 via the connector pins 41, 42 and the terminals of the other connector 9. The signal lines 91, 92 are connected to, e.g., a control device that controls an electric motor operated by a current flowing through the electric wires 21, 22, and when temperature detected by the temperature sensor 3 becomes not less than a predetermined value, the control device stops or suppresses the current flowing through the electric wires 21, 22.

As a resin material for the electric wire holding member 6 and the sensor holding member 7, it is desirable to use a highly thermally-conductive resin material having a higher thermal conductivity than the molded resin member 50. By forming the electric wire holding member 6 and the sensor holding member 7 using a highly thermally-conductive resin material, it is possible to detect temperature of the electric wires 21, 22 more accurately.

Effects of the Embodiment

In the embodiment of the invention described above, when molding the molded resin member 50 using a mold, it is not necessary to lead plural signal lines connected to the lead wires 31, 32 of the temperature sensor 3 out of a cavity of this mold. Thus, it is easy to manufacture the wiring component with temperature sensor 1 by an automated manufacturing equipment and the cost can be reduced.

In addition, in the present embodiment, since the electric wires 21, 22 and the temperature sensor 3 are collectively held by the holder 5, a distance between the electric wires 21, 22 and the detection unit 30 of the temperature sensor 3 can be maintained constant in accordance with the design value and it is possible to increase accuracy of detecting temperature of the electric wires 21, 22.

Summary of the Embodiment

Technical ideas understood from the embodiment will be described below citing the reference numerals, etc., used for the embodiment. However, each reference numeral described below is not intended to limit the constituent elements in the claims to the members, etc., specifically described in the embodiment.

A wiring component with temperature sensor (1), comprising: an electric wire (21, 22); a temperature sensor (3) comprising a detection unit (30) configured to detect temperature of the electric wire (21, 22) and a plurality of lead wires (31, 32); and a plurality of connector pins (41, 42) respectively connected to the plurality of lead wires (31, 32), wherein the electric wire (21, 22), the temperature sensor (3) and the plurality of connector pins (41, 42) are collectively held by a holder (5) comprising a resin, and wherein the holder (5) comprises a connector housing member (8) configured to hold the plurality of connector pins (41, 42) and a molded resin member (50) covering a portion of the connector housing member (8).

The wiring component with temperature sensor (1) described in [1], wherein the holder (5) comprises an electric wire holding member (6) configured to hold the electric wire (21, 22) and a sensor holding member (7) configured to hold the temperature sensor (3), and wherein the electric wire holding member (6) and the sensor holding member (7), together with the connector housing member (8), are integrated by the molded resin member (50).

The wiring component with temperature sensor (1) described in [2], wherein a housing hole (63) configured to house the sensor holding member (7) is formed on the electric wire holding member (6), and wherein the electric wire holding member (6) and the sensor holding member (7) are integrated in a state in which the sensor holding member (7) is housed in the housing hole (63).

The wiring component with temperature sensor (1) described in [3], wherein a plurality of the electric wires (21, 22) are held by the electric wire holding member (6) so as to be in parallel and at a distance from each other along a predetermined arrangement direction ($D_1$), and wherein the housing hole (63) is formed between the electric wires (21, 22) when the plurality of the electric wires (21, 22) are viewed in a direction ($D_3$) that is perpendicular to the arrangement direction ($D_1$) and a longitudinal direction ($D_2$) of the electric wires.

Although the embodiment of the invention has been described, the invention according to claims is not to be limited to the embodiment described above. Further, please note that not all combinations of the features described in the embodiment are necessary to solve the problem of the invention.

The invention claimed is:

1. A wiring component with temperature sensor, comprising:
   an electric wire as a temperature measurement target object;
   a temperature sensor comprising a detection unit configured to detect temperature of the electric wire and a plurality of lead wires; and
   a plurality of connector pins respectively connected to the plurality of lead wires,
   wherein the electric wire, the temperature sensor and the plurality of connector pins are collectively held by a holder comprising a resin, and
   wherein the holder comprises a connector housing member configured to hold the plurality of connector pins and a molded resin member covering a portion of the connector housing member,
   wherein the holder comprises an electric wire holding member configured to hold the electric wire and a sensor holding member configured to hold the temperature sensor, and wherein the electric wire holding member and the sensor holding member, together with the connector housing member, are integrated by the molded resin member, and
   wherein the temperature sensor does not directly contact the sensor mold resin member.

2. The wiring component with temperature sensor according to claim 1,
   wherein a housing hole configured to house the sensor holding member is formed on the electric wire holding member, and
   wherein the electric wire holding member and the sensor holding member are integrated in a state in which the sensor holding member is housed in the housing hole.

3. The wiring component with temperature sensor according to claim 2,
   wherein a plurality of the electric wires are held by the electric wire holding member so as to be in parallel and at a distance from each other along a predetermined arrangement direction, and
   wherein the housing hole is formed between the electric wires when the plurality of the electric wires are viewed in a direction that is perpendicular to the arrangement direction and a longitudinal direction of the electric wires.

4. The wiring component with temperature sensor according to claim 1, wherein the electric wire is not connected to the plurality of lead wires.

5. The wiring component with temperature sensor according to claim 1, wherein the connector housing member includes a cylindrical portion and a longitudinal portion of each of the plurality of connector pins is accommodated in the cylindrical portion.

6. The wiring component with temperature sensor according to claim 1, wherein the connector housing protrudes from the molded resin member in a direction intersecting a longitudinal direction of the electric wire.

7. The wiring component with temperature sensor according to claim 1, wherein each of the plurality of connector pins protrudes in a direction intersecting a longitudinal direction of the electric wire.

8. The wiring component with temperature sensor according to claim 1, wherein the electric wire that is the temperature measurement target object extends into and out of the holder, and wherein both ends of the electric wire are exposed from the holder, respectively.

9. The wiring component with temperature sensor according to claim 1, wherein the electric wire holding member, the sensor holding member, and the connector housing member are formed separately and integrated by the molded resin member.

10. The wiring component with temperature sensor according to claim 1, wherein the temperature sensor does not directly contact the electric wire.

11. The wiring component with temperature sensor according to claim 1, wherein the temperature sensor is separated from the electric wire by a portion of the electric wire holding member.

12. The wiring component with temperature sensor according to claim 1, wherein the temperature sensor is separated from the electric wire by a portion of the sensor holding member.

13. The wiring component with temperature sensor according to claim 1, wherein the temperature sensor is separated from the electric wire by a portion of the electric wire holding member and a portion of the sensor holding member.

14. The wiring component with temperature sensor according to claim 1, wherein the connector housing member is mechanically separate from the holder and is disposed orthogonally with respect to a longitudinal direction of the electric wire.

* * * * *